United States Patent [19]

Vogl

[11] Patent Number: 4,629,295
[45] Date of Patent: Dec. 16, 1986

[54] NIGHT VISION INSTRUMENT WITH ELECTRONIC IMAGE CONVERTER

[75] Inventor: Georg Vogl, Saltsjöbaden, Sweden

[73] Assignee: Simrad Optronics A/S, Oslo, Norway

[21] Appl. No.: 711,513

[22] PCT Filed: Jul. 6, 1984

[86] PCT No.: PCT/SE84/00254
§ 371 Date: Mar. 5, 1985
§ 102(e) Date: Mar. 5, 1985

[87] PCT Pub. No.: WO85/00433
PCT Pub. Date: Jan. 31, 1985

[30] Foreign Application Priority Data
Jul. 7, 1983 [SE] Sweden ................................. 8303889

[51] Int. Cl.⁴ ...................... G02B 23/04; G02B 23/05; G02B 23/12
[52] U.S. Cl. .................................... 350/503; 350/502; 350/538; 350/557; 350/1.2
[58] Field of Search .................. 350/1.2, 1.3, 1.4, 503, 350/504, 505, 538, 541, 502, 557; 250/213 VT

[56] References Cited
U.S. PATENT DOCUMENTS
3,173,012 3/1965 DeWinter ............................ 350/1.2

FOREIGN PATENT DOCUMENTS
1150976 11/1967 United Kingdom ......... 250/213 VT
161537 3/1964 U.S.S.R. ............................... 350/503

OTHER PUBLICATIONS
Scientific American, *Amateur Telescope Making Advanced*, pp. 516-517, 1946.

Primary Examiner—Jon W. Henry
Attorney, Agent, or Firm—Cushman, Darby & Cushman

[57] ABSTRACT

Figure 3:
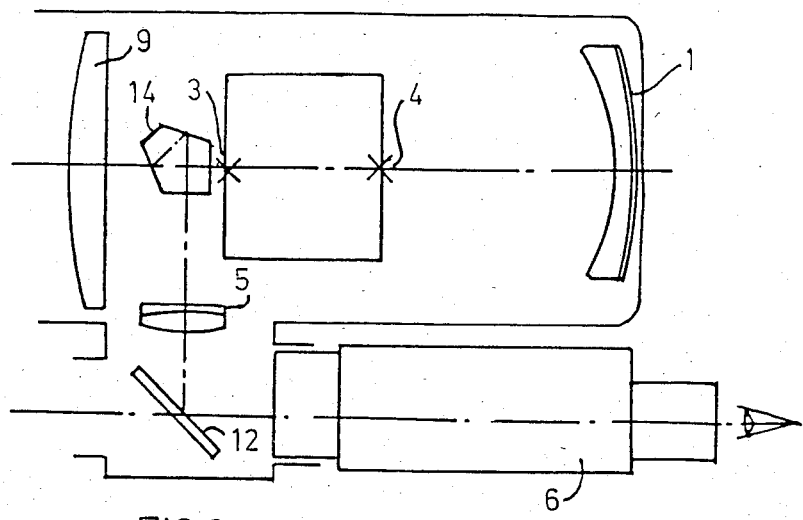

A night vision instrument with an electronic image converter, comprising for example an image intensifier tube or a similar device. This night vision instrument (FIG. 3) may be located beside an ordinary telescope, sight, TV-camera or similar device (6) so that this same device may be used during night time. The combined system (FIG. 3) thus arranged is very compact, with the center of gravity close to the user during handheld operation. The lightgathering objective lens consists moreover of only one mirror (1) and the image emerging on the screen (3) of the electronic image converter is facing the corresponding object being viewed. The image on the screen (3) is finally collimated so that it may pass into the entrance aperture of some other instrument (6) in parallel, and this image transfer is accomplished with three reflections or less and without any intermediate real image.

3 Claims, 3 Drawing Figures

NIGHT VISION INSTRUMENT WITH ELECTRONIC IMAGE CONVERTER

A night vision instrument includes of a high speed lens which reproduces an object on the photocathode of an image intensifier tube or similar device. The incident photons are in this manner transformed into electrons which are multiplied and focused onto a phosphorous screen or a similar device so that an image of the object emerges. This image, which is created by electronic means, is viewed with the aid of for example an eyepiece or a microscope. The image is sometimes transferred optically into a telescope through which it can be viewed alternately with the ordinary daylight view. The optical relay system may consist of a collimator lens (eyepiece) which creates an image of the phosphorous screen at an infinite image distance. This image is often inverted by means of a fiber optical twister or by electronic technique inside the tube.

The need of a large relative aperture makes it often suitable to use a specially designed catadioptric mirror objective of the cassegrain type, i.e. consisting of a large lightgathering mirror with a hole, and a smaller secondary mirror, usually applied on some correction lens. The rays from the object will first pass beside the secondary mirror, then reflect twice and finally focus into an image, usually located close to the hole in the primary mirror. The central obstruction caused by the secondary mirror may thus be considerable. Another drawback is the relatively low reflection coefficient of the secondary mirror which causes a reduction of the energy efficiency. Deformations of the secondary mirror due to mechanical or thermal disturbances may moreover reduce the sensitivity because the incident photons are spread over a larger area of the image intensifier photocathode. There are thus good reasons to avoid the secondary mirror altogether.

Figure 1:
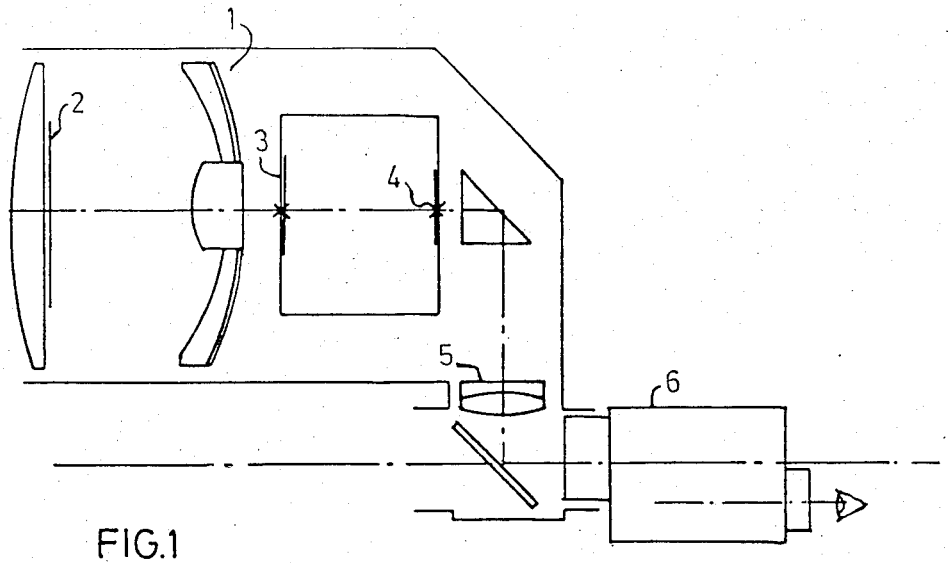

FIG. 1 shows a commonly known and used construction drawn in approximately the correct proportions. The primary mirror 1 creates an image which is focused via the secondary mirror 2 on the photocathode 3. The image intensifier screen 4 is viewed through an eyepiece, or the optical information may be transferred into the daylight telescope 6 by means of the collimation objective 5.

Comfortable handheld operation in this application is apparently inhibited by the fact that the centre of gravity is located too near the front lens.

According to the invention the photocathode of the image intensifier is localized directly on the image plane of the primary mirror. The phosphorous screen is now viewed via suitable prisms and/or mirrors from the same direction as the object. Under, above or along the side of this nightvision system is emerging a natural space where for example a daylight telescope may be placed so that the image transfer from the nightvision instrument can be arranged in a straight way via the entrance aperture of the daylight telescope. The daylight telescope and the nightvision instrument may consequently be positioned side by side so that they comprise a compact configuration with the centre of gravity far backwards, making it suitable for handheld use. All the drawbacks associated with a secondary mirror have moreover been avoided in this simple manner.

Figure 2:
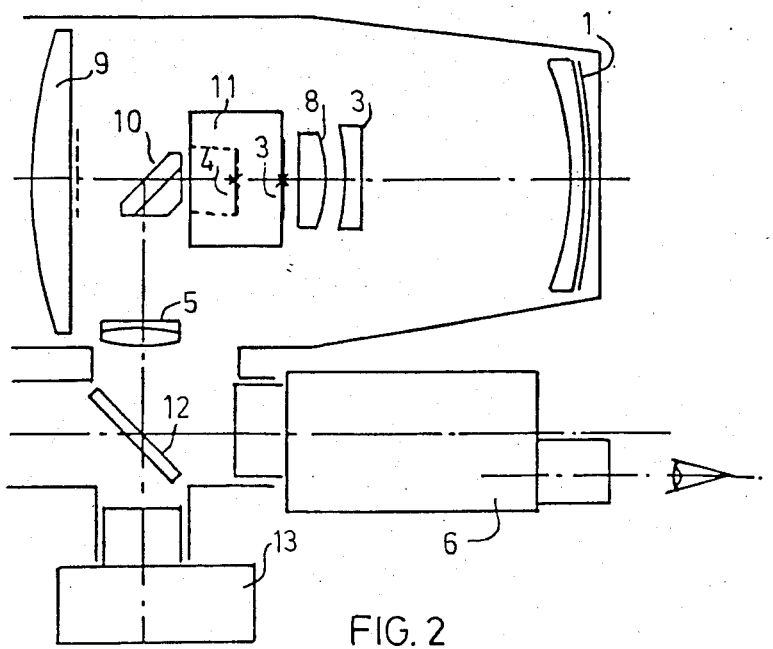

FIG. 2 shows the invention, again with the correct proportions. An image of the object is created by the mirror 1 on the image intensifier photocathode 3 and the screen 4 of the tube is viewed via prisms and/or mirrors and the collimation objective 5 through the daylight telescope 6. There is at the same time a possibility to photograph the image with a camera 13. Correction lenses 7,8 may, or may not, be inserted between the primary mirror 1 and the image intensifier tube 11 and even the window 9, which seals and protects the internal parts of the night vision instrument may be shaped into a lens.

A comparison with FIG. 1 reveals a further advantage: The central obstruction in FIG. 2 is set by the external diameter of the image intensifier, about 40 too 55 mm. With an ordinary nightvision instrument, according to FIG. 1, the obstruction (secondary mirror) diameter is inserted set by the geometry of the objective lens and the field of view. An obstruction diameter of about 60 mm is for example required with a 100 mm objective focal length. Any increase of the objective focal length and the entrance aperture will however cause a proportional increase of the secondary mirror. According to the invention (FIG. 2) on the other hand, the image intensifier diameter will remain unaltered and this advantage becomes more and more pronounced as the night vision instrument grows bigger.

It has to be considered that the correction power of the secondary mirror is wanting when constructing an objective lens according to the invention but this correction may be achieved in other ways. All commonly used elements for the construction of a mirror objective may otherwise be used, like aspherical and spherical mirrors, so called Mangin mirrors, spherical and aspherical correction lenses and symmetrical- and null-lenses.

A right angle roof prism 10 in combination with a mirror (or equivalent prism) as depicted in FIG. 2 makes a suitable combination when transferring the image from the photocathode screen 4 into the daylight telescope 6. A non inverting image intensifier should be used in this case. If an inverting image intensifier is used, the image transfer may be arranged according to FIG. 3, where instead a pentagon prism 14 followed by a mirror (or prism) is used.

The mirror/prism in front of the daylight telescope 6 can be made partly transparent so that an ordinary daylight view of the object can be seen through the mirror 12, and a corresponding night scene composed of light which is reflected by the same mirror 12, may also be seen.

The use of an ordinary type of image intensifier tube is presumed in the invention. The utility of the invention is however certainly not limited to this specific technique. Other electronic image converters working according to various principles and/or with different wavelengths such as for example infrared (IR) rays are equally applicable in the invention.

I claim:

1. A night vision instrument having a first imaging system of field-glass type provided with a first entrance aperture at a front side end and an ocular at the other end for viewing a scene therethrough, and a second imaging system provided at its front end with a second entrance aperture larger than the first, and at the other end thereof a concave mirror for imaging light-rays from the scene, a light intensifier having an entrance surface for projecting a weak-light image thereto and an opposite exit surface for obtaining an intensified image of said weak-light image, and mirror means for projecting said intensified image into the ray-path of said first imaging system for viewing by said ocular of said first imaging system, wherein said concave mirror faces said entrance surface of said light intensifier, said exit surface thereof facing said second entrance aperture, and said mirror means catching said intensified image from the front side of said image intensifier.

2. A night vision instrument according to claim 1, wherein rays from said second entrance aperture are reflected by one mirror only toward said entrance surface of said image intensifier.

3. A night vision instrument according to claim 2, wherein a correction lens system is inserted in the ray-path of the second imaging system at a location between said concave mirror and said entrance surface of said image intensifier.

* * * * *